United States Patent [19]

Maranell et al.

[11] Patent Number: 4,539,938
[45] Date of Patent: Sep. 10, 1985

[54] LEAK RESISTANT POULTRY WATERING DEVICE

[76] Inventors: M. C. Maranell, 1108 Village Rd., Chaska, Minn. 55318; LeRoy A. Kortlever, Rochester, Wash.

[21] Appl. No.: 565,480

[22] Filed: Dec. 27, 1983

[51] Int. Cl.³ .................................................. A01K 7/02
[52] U.S. Cl. ........................................................ 119/75
[58] Field of Search .......................... 119/72, 72.5, 75

[56] References Cited

U.S. PATENT DOCUMENTS

| | | | |
|---|---|---|---|
| 304,165 | 8/1884 | Brown | 119/75 |
| 3,483,847 | 12/1969 | Kneubuehl | 119/75 |
| 3,994,263 | 11/1976 | Sahagun | 119/75 |
| 4,338,884 | 7/1982 | Atchley et al. | 119/75 |
| 4,402,343 | 9/1983 | Thompson et al. | 119/72.5 |

Primary Examiner—Hugh R. Chamblee
Attorney, Agent, or Firm—Williamson, Bains, Moore & Hansen

[57] ABSTRACT

A chicken watering device solves the problem of leakage while still allowing easy actuation of the trigger by a bird by utilizing a coil spring having a spring coefficient of one to two pounds per inch of displacement and prevents jamming of the device by feed, cage waste and the like through use of a conical portion positioned along the inlet conduit and surrounding the trigger.

2 Claims, 4 Drawing Figures

U.S. Patent  Sep. 10, 1985  4,539,938
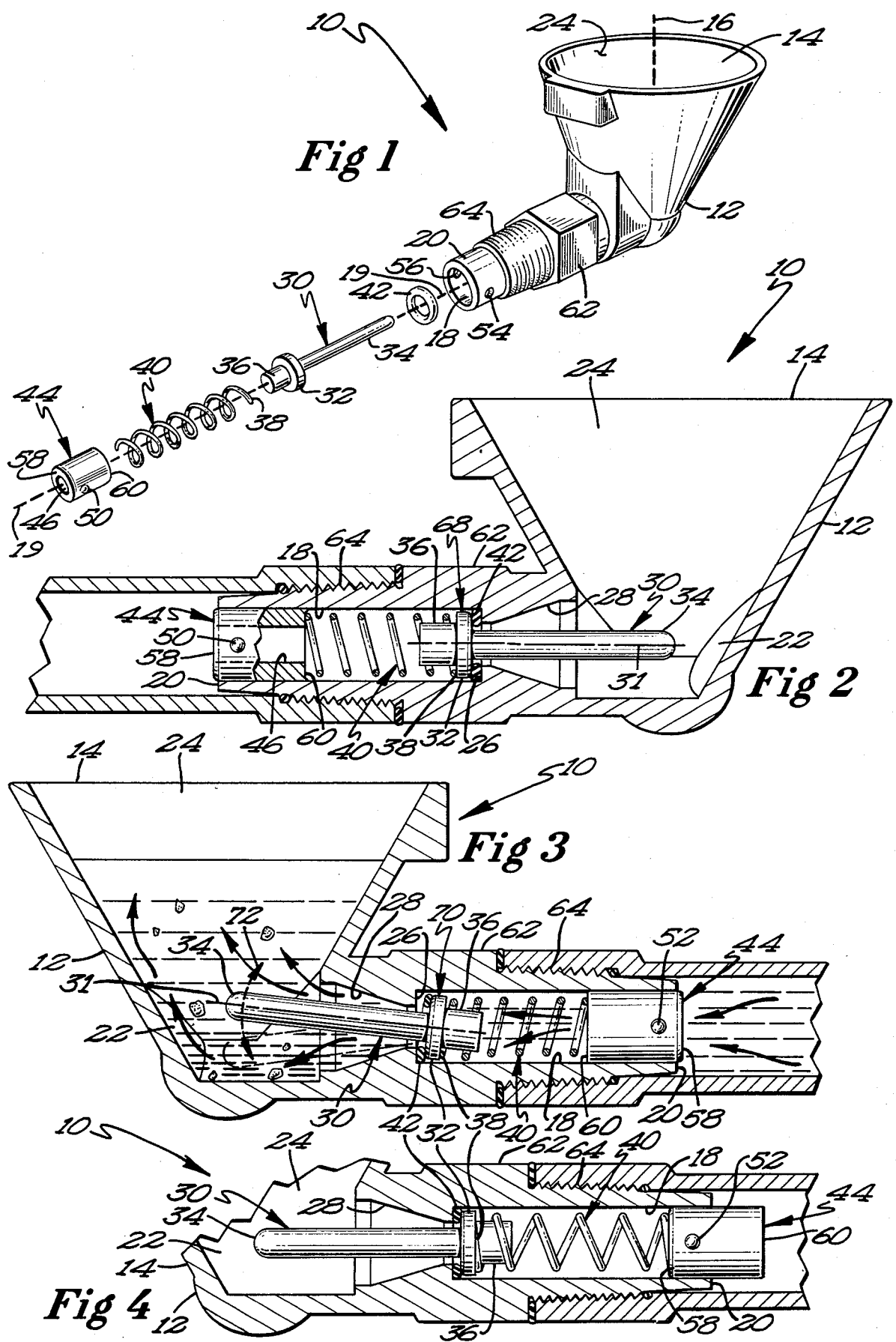

LEAK RESISTANT POULTRY WATERING DEVICE

BACKGROUND OF THE INVENTION

The invention relates to the field of poultry watering devices and comprises a leak resistant watering cup which is easily actuated by poultry.

Modern poultry farms generally include large coops featuring numerous racks of in-line cages often containing thousands of chickens and utilizing automatic feeding and watering equipment. Typically each cage is provided with an individual watering cup which is connected with a central water system. Because of the large quantity of poultry, it is often difficult to supervise individual cages and to identify failing equipment until it is too late and valuable poultry have perished.

While a large variety of poultry watering devices have been introduced over the years, none of the existing products has wholly satisfied the need for elimination of water leakage but still allowed unrestricted operation of the device by the birds. These two goals have sometimes seemed mutually exclusive and achievement of both has proved extremely difficult. While the valves of individual chicken watering devices can be easily made leak-free by applying needed additional pressure to the valves to assure complete closure, such a solution has the unfortunate side effect of making the triggering mechanism of the device so stiff as to preclude some poultry from adequately actuating the device to inject additional water.

Poultry houses utilize different types of water delivery systems, some having simple gravity pressure for water flow, while others utilize relatively high municipal water pressure. As a further complicating factor, as the water is piped to large arrays of cages occupying multiple rows and racks and having water supply lines with multiple divisions and subdivisions, the final outlet pressure can vary substantially and often unpredictably from one area to another. This substantial range of varying pressures has complicated the task of designing a single chicken watering device which is usable over the substantial pressure ranges commonly encountered in poultry houses.

These pressure variations are generally incompatible with existing watering devices and those devices subject to pressures for which they were not designed leak badly. It is particularly important in poultry raising that dampness and leakage be eliminated from the cage area because they frequently lead to unsanitary and potentially disease inducing conditions in which the birds have a higher mortality rate.

Designing an effective watering device has also been complicated by the fact that the amount of pressure a chicken can apply to actuate a valve trigger is often suprisingly small because of the now common practice of de-beaking the chicken, a process which removes much of the beak to reduce fighting between chickens but makes the chicken's beak so tender as to reduce its ability to actuate even a moderately stiff valve trigger.

Many known watering devices depend solely on the inlet water pressure to achieve a closure of their valves. These structures are prone to substantial leaking when the pressure is lower than expected and their trigger valves become excessively stiff and resist opening by a bird when the water pressure is higher than expected.

Still other types of chicken watering devices are known which utilize a spring loaded valve which can generally successfully prevent leakage, but which because of the spring or design is often so stiff as to defy actuation by a de-beaked chicken. Various alternative triggering structures have been developed in the art which give the chicken additional leverage to permit actuation of the trigger while still maintaining a high spring force on the valve, but these are often expensive or so cumbersome as to be impractical. They also are more prone to failure when food and cage waste materials become lodged in and around the trigger mechanism and cause jamming and malfunction.

With the above problems and challenges, commercially available watering devices have prior to the present invention been unable to satisfy both the requirements of minimal leakage and the need to allow the poultry to actuate the device easily and consistently, with little failure. As will be appreciated by those skilled in the art, it is crucial that the chicken or other bird be able to rapidly master the triggering system of the watering device and be successful in obtaining water in almost every instance or the bird rapidly gives up working the device and thereafter dies of dehydration.

Among the better watering devices introduced in recent years is the device shown in U.S. Pat. No. 3,862,621, to William S. Peppler, in which a chicken watering cup utilizes an elongated trigger shaft having a valve disc which cooperates with a valve seat to control water flow into the watering cup. This device depends on ambient water pressure to keep it closed and is actuated by a bird wobbling the shaft to dislodge the valve disc from the valve seat. A variation of the Peppler device has been commercially available as part of the prior art and utilizes a coil spring to urge the shaft and valve disc against the valve seat. Prior to the present invention, however, the springs used were either too stiff for bird actuation or too weak to consistently prevent leakage. In the past, watering devices have had to be designed to allow most chickens to actuate them and manufacturers have simply had to accept the leakage that up to now appeared unavoidable. The Peppler device adopted a middle ground and installed a drain to remove the water leakage. While effective, such drains increase the cost of installation and can require additional, expensive plumbing.

The present invention is directed toward the solution of these problems and provides a watering device utilizing a triggering system similar to that of the Peppler device but which is provided with a spring system having a very narrow, carefully controlled range of spring biasing force which is perfectly suited to the requirement of minimal leakage while permitting free actuation by poultry.

SUMMARY OF THE INVENTION

The present invention solves the longstanding problem of the prior art by utilizing an improved valve with a coil spring having a spring coefficient between one and two pounds per inch of spring displacement, the spring being mounted on the axis of a tippable trigger shaft to urge a disc valve against a valve seat in the chicken watering device. The watering device utilizes a generally conical, upright reservoir which communicates with an elongated conduit which is connected to a water supply. The combination of a tippable trigger shaft with the specially formulated spring provides a new combination resulting in a leak resistant valve which is still readily actuatable by even a de-beaked chicken.

Adjacent the right angled junction of the conduit and reservoir, a conical outlet portion is positioned coaxially on the conduit with the cone increasing in diameter from the valve seat toward the reservoir so as to encourage flushing of the outlet portion when water flows from the conduit into the reservoir. This structure eliminates the problem encountered in prior art watering devices of unwanted feed and extraneous cage waster accumulating around the trigger shaft and jamming or obstructing normal operation.

These and other objects and advantages of the invention will appear more fully from the following description made in conjunction with the accompanying drawings wherein like reference characters refer to the same or similar parts throughout the several views.

DESCRIPTION OF THE DRAWINGS

FIG. 1 is an exploded perspective view of a watering device embodying the invention.

FIG. 2 is a full size cross sectional side elevation view of the embodiment of FIG. 1 showing the valve in a closed position.

FIG. 3 is a cross sectional side elevation view of the embodiment of FIG. 1 showing the valve in an open position.

FIG. 4 is a partial cross sectional side view showing the inlet end of the device and illustrating an alternative position of the retaining sleeve.

DESCRIPTION OF THE PREFERRED EMBODIMENT

Referring now to the drawings, a poultry watering device 10, embodying the invention, utilizes a rigid integral housing 12 formed of molded plastic material. The housing 12 includes a generally upright, conical water reservoir 14 having a generally upright axis 16. The integral housing 12 further includes a substantially straight, circular cross section, elongated water conduit 18 with a central axis 19 and having a first or inlet end 20 and a second, outlet end 22 which joins the inner periphery 24 of the reservoir 14. The axes 19 and 16 are substantially perpendicular to one another.

Positioned along the conduit 18 is a generally annular, flat shoulder 26 which defines a valve seat. The inner periphery of the conduit 18 has a generally conical outlet portion 28 extending between the conduit line of intersection with the shoulder 26 to the line of intersection with the periphery 24 of the reservoir. This conical portion 28 between the valve seat and the reservoir, increases in diameter from seat to reservoir and is helpful in avoiding plugging and jamming of the device 10, as will be described further hereafter.

An elongated trigger shaft 30 having a longitudinal axis 31 and formed of a rigid material such as plastic or metal, is insertable within the conduit 18 and includes an annular valve disc 32 positioned therealong and integral with the shaft. The shaft 30 has a long segment 34 which extends beyond the valve seat 26 and into the reservoir 14 to provide a trigger which can be actuated by a bird's back during watering. The shaft 30 has an integral short segment 36 which receives the open end 38 of a coil spring 40 which bias the end 38 against the valve disc 32. An annular gasket or O-ring 42 is received coaxially on the long segment 34 to bear against the disc 32. The trigger shaft 30 and gasket 42 cooperate with one another to define a valve, the valve disc 32 urging the gasket 42 against valve seat 26 when spring tension is applied to the shaft 30 by spring 40.

An elongated sleeve 44 has a central bore 46 therethrough to permit water flow from a water supply 48 into the conduit 18 and thence to the reservoir 14. The sleeve 44 has first and second diametrically positioned and outwardly extending detents 50 and 52 which engage sockets 54 and 56, respectively, in the conduit 18 with sleeve end 60 against the spring, the spring 40 is compressed a predetermined amount between the end 60 of the sleeve and the valve disc 32. If it is desirable to reduce the spring tension, as in the case of very young birds, the sleeve 44 may be removed and reversed with the end 58 contacting the spring as shown in FIG. 4. Since the detents 50 and 52 are positioned adjacent end 58 and remote from end 60, the spacing between the end 58 and the valve disc 32 is increased with the configuration of FIG. 4 thereby reducing the spring tension against the valve disc 32. When servicing the watering requirements of very young chickens, it can be necessary for a short time during early growth to provide more relaxed spring tension, and use of the sleeve 44 with the sleeve end 58 confronting the valve disc is then helpful.

It has been found that the most suitable spring for use with the invention is a lightly flexed stainless steel spring with a long lasting, predictable, relatively constant spring coefficient. Use of other springs which are subject to rusting and corrosion has resulted in such corrosion eventually altering the spring coefficient, resulting in too little spring tension against the valve and resulting leakage. In order to assure a relatively leak resistant seal between valve seat 26 and the valve, the spring coefficient of spring 40 should be between one and two pounds per inch of displacement with best results occurring when the spring coefficient is between 1.25 and 1.75 pounds per inch of displacement. It is believed that the best result is obtained with a spring coefficient of 1.5 pounds per inch of displacement with the coil spring having an overall unstressed length of approximately $\frac{3}{4}$ inch. When the spring is installed in the device 10 in the configuration shown in FIGS. 2 and 3, the spring is compressed approximately $\frac{3}{8}$ inch and a force of approximately $\frac{1}{4}$ to $\frac{3}{4}$ pound is applied against the valve disc.

The watering device 10 is provided with an integral molded, hexagonal nut 62 which is receivable in a conventional wrench for tightening the pipe threads 64 into an appropriate commercially available plumbing fitting to assure a watertight connection with the water supply 48.

A bracket 66 extends rearwardly from the reservoir and may be easily snapped onto an upright support post of the poultry cage for added support of the device 10.

If desired, the device 10 can be supplied without pipe threads 64 and instead, provided with other types of commercially available plumbing connectors, and any plumbing fitting usable with commercially available systems is contemplated and within the purview of the invention.

In operation, the operator connects the device 10 to a water supply 48 by tightening the threads 64 into a plumbing fitting adjacent the poultry cage and snaps the bracket 66 onto an upright of the cage. When the water supply is turned on, water flows from the water source through the bore 46 of sleeve 44 and into the conduit 18, flows beyond the valve seat 26 being blocked when the trigger shaft 30 is in the closed position 68 of FIG. 2 with the O-ring 42 interposed between the spring biased valve disc 32 and the valve seat. The spring 40 when compressed between the disc 32 and end 60 of sleeve 58 produces a biasing force applied against the annular disc 32, such force being between ¼ and ¾ pound and preventing leakage past the valve seat when the valve is in a closed position 68.

When the trigger shaft 30 is moved to the open position 70 shown in FIG. 3, by a bird applying force 72 to the trigger shaft to move the long segment 34 to a position off the central axis 19 of the conduit, the disc 32 pivots at its edge against the O-ring 42 introducing a gap between the valve seat 26 and the O-ring to permit water flow from the conduit into the reservoir. The depth of the reservoir is preferably on the order of one inch so that a chicken, depressing the trigger shaft 30, will be forced to release the shaft before the water level reaches the rim of the reservoir. The specific depth is selected because it has been found that a chicken depressing the trigger shaft with the indicated reservoir depth will have his breathing passages covered by water if he does not release the trigger shaft before the reservoir fills.

As the trigger shaft is moved to the open position 70 of FIG. 3, water flow from the conduit flows outwardly through the conical region 28 and flushes any extraneous feed or waste materials in the reservoir upwardly to mix with the incoming water, the combination of water and feed being then substantially consumed by the poultry. This flushing feature helps to avoid the accumulation of unwanted material around and adjacent the trigger shaft and the potential jamming or malfunction of the trigger if such unwanted matter were not removed. When force 72 on the trigger shaft is removed by the chicken withdrawing its beak from the reservoir, the biasing force generated by the compressed spring 40 urges the valve disc 32 firmly against the O-ring 42 and the O-ring against the valve seat 26, effectively interrupting water flow and sealing the valve seat.

Accordingly, the invention provides a simple, highly reliable, easily manufactured poultry watering device which is resistant to malfunction, long lasting, and highly leak resistant and capable of easier activation by poultry.

While the preferred embodiments of the present invention have been described, it should be understood that various changes, adaptions and modifications may be made therein without departing from the spirit of the invention and the scope of the appended claims.

What is claimed is:

1. A leak resistant poultry watering device connectable to a water supply and selectively actuatable by poultry, comprising:
   a rigid housing of waterproof, water impervious material, said housing including an upright water reservoir accessible to the chicken and having a top and bottom and a water entry conduit having a first end connectable to the water supply and a second end communicating with said reservoir;
   said conduit including a valve seat therealong;
   a valve confronting said valve seat and including a straight, elongated trigger shaft extending into said reservoir and accessible to poultry and having a valve disc therealong, said valve movable relative to said seat between a closed position against said seat and an open position having a gap between said valve and seat in response to movement of said trigger shaft by poultry;
   a coil spring within said conduit and bearing against said valve disc to bias said valve against said valve seat with a biasing force between ¼ and ¾ pound of force against the valve disc for positive sealing of said valve disc against said valve seat to prevent leakage while still permitting movement of said trigger by poultry to allow water flow into said reservoir;
   retaining means engaging said body to urge said spring against said valve disc and bias said valve disc against said valve seat;
   said retaining means including a cylindrical sleeve having first and second ends and outwardly projecting detent means, said sleeve having a central bore to allow water flow therealong and said sleeve being insertable coaxially in said conduit, said conduit including at least one socket along said conduit channel to receive said detent means and retain said sleeve in said channel to bias said spring against said valve disc; and
   said detent means being positioned nearer said first end of said sleeve than to said second end to permit said sleeve to be reversibly receivable within said conduit to thereby provide two levels of spring compression to have a heavier spring tension and lighter tension, for adult and young chickens, respectively.

2. The combination of claim 1 wherein said retaining means includes a pair of detents, and said detents are positioned nearer said first end of said sleeve than said second end to permit said sleeve to be reversibly receivable within said conduit to thereby provide two levels of spring compression to have a heavier spring tension and lighter tension, for adult and young chickens, respectively.

* * * * *